United States Patent Office 2,995,488
Patented Aug. 8, 1961

2,995,488
SYNERGISTIC INSECTICIDAL COMPOSITIONS
Howard A. Jones and John A. Garman, Baltimore, Md., and Berton C. Dickinson, Lyndonville, N.Y., assignors to Food Machinery and Chemical Corporation, New York, N.Y., a corporation of Delaware
No Drawing. Original application Mar. 24, 1955, Ser. No. 496,596. Divided and this application Oct. 23, 1958, Ser. No. 769,103
2 Claims. (Cl. 167—30)

This invention relates broadly to insecticidal compositions, and more particularly to insecticidal compositions containing ethyl N-benzylcarbamate and O,O-diethyl O-(7 - (3-chloro-4-methylcoumaryl))thiophosphate, hereinafter referred to as B–21/199. More particularly, this invention relates to synergistic insecticidal compositions of these compounds wherein the insecticidal effectiveness of each component is enhanced by the presence of the other to produce an unexpected combined effect.

When two or more substances in combination show an unexpectedly high activity, as, for instance, insecticidal activity, the resulting phenomenon is called synergism. The mechanism of synergism is by no means understood. It is, in fact, quite probable that it differs with different synergistic combinations. The term "synergism" can be defined, however, as a cooperative action which is encountered in combinations of two or more biologically active components in which the combined activity of the two components exceeds the sum of the activities of the components when used alone. The insecticidal activity of the mixed components cannot be predicted from known values of the individual components, but is unpredictable and depends on the individual activity of neither.

It is an object of this invention to provide insecticidal compositions of enhanced killing power. Another object of this invention is to produce novel compositions containing compounds capable of synergizing the knockdown and killing properties of individual toxicants. A further object of this invention is to provide compositions including a relatively toxic phosphorus containing insecticide in which superior insecticidal activity is obtained because of the synergistic effects, but in which the ultimate toxicity to warm-blooded animals is greatly reduced because of the lower concentrations of the phosphorous compounds required when used in combination with the relatively less toxic carbamates. Other objects and advantages of the invention will become apparent from the description of the invention set forth below.

According to this invention, there are provided synergistic insecticidal compositions comprising O,O-diethyl O - (7-(3-chloro-4-methylcoumaryl))thiophosphate, hereafter called B–21/199, and ethyl N-benzylcarbamate.

The synergistic insecticidal compositions of this invention may be used on a wide variety of insect and mite species, but are particularly effective against house flies. The combinations are highly effective and economical to use for such large-scale insecticidal requirements as the control of truck crop, forage crop and orchard insects.

The synergistic compositions of this invention can be formulated as aqueous emulsions, as dry or wettable powders, as solutions or in any other suitable vehicle. The insecticidal compositions can be utilized as sprays, as dusts, as aerosol mixtures, insecticidal coating compositions, and as residues. In general, they can be applied by methods commonly used for control or eradication of insects, mites and the like. Thus these insecticidal compositions can be formulated with solvents, diluents and carrier media, adhesives, spreading, wetting and emulsifying agents and other ingredients.

The relative proportions of the active ingredients as well as inert carriers, solvents, dispersants and the like may vary within wide limits.

Thus the relative proportion (ratio) of the B–21/199 to the ethyl N-benzylcarbamate can range from 20 parts of the former per 1 part of the latter to 1 part of the former per 40 parts of the latter and preferably about 1 part of the former to about 5 parts of the latter.

The quantities of the component toxicants in the final insecticidal compositions can range from 0.01% to 25.00% for the B–21/199 and from 0.05% to 50.00% for the carbamate, and preferably from 0.10% to 10.00% for the B–21/199 and from 0.10% to 25.00% for the carbamate.

The procedures of the testing method are described below. The details of the test experiments including the type of formulation and mode of application or dosing, and the species of insects which served as test subjects are given in the examples.

The test method used is described as follows:

TURNTABLE METHOD

*House flies.*—This method is described in the article, Campbell and Sullivan, Soap and Sanitary Chemicals, 14 (6); 119–125, 149 (1938). The tests were carried out with slight modifications from the method described in the reference above.

The table used is equipped with 8 towers. The period between spraying and actual exposure of settling mist to the test flies is 6 seconds, and flies are exposed to the settling mist for 10 minutes. The sprayer is operated at 5 p.s.i.g. Five milliliters of test solution are used for each test. There is a filter paper placed in the bottom of each test dish containing the house flies undergoing tests. Mortality counts are made after 24 hours.

The flies used in these tests were reared according to standard procedures established by the Chemical Specialties Manufacturers Association, as described in the article "Peet-Grady Method" in the 1952 Soap Blue Book. The flies tested are 3 days old.

*Table 1*

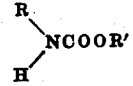

| Carbamate | | | Phosphate | | Test Method | Test Subject | Mortality at 24 hrs. (percent) |
|---|---|---|---|---|---|---|---|
| R | R' | Conc. (mg./ 100 ml.) | Name | Conc. (mg./ 100 ml.) | | | |
| Benzyl | ethyl | 500 | | | Turntable | Houseflies | 4 |
| | | | B–21/199 | 50 | do | do | 65 |
| Do | ethyl | 250 | B–21/199 | 50 | do | do | 90 |

This table demonstrates the unexpected effectiveness of the insecticidal compositions of this invention against house flies.

This application is a devision of copending application Serial No. 496,596 filed March 24, 1955, now abandoned, which is a continuation-in-part of Serial No. 427,374, filed May 3, 1954, now abandoned.

That which is claimed as patentably novel is:

1. Synergistic insecticidal compositions comprising O,O-diethyl O-(7-(3-chloro-4-methylcoumaryl))thiophosphate and ethyl N-benzylcarbamate, wherein said components are present in the ratio of about five parts of said carbamate per part of said thiophosphate.

2. The method of killing insects which comprises applying to the insects and their habitat a synergistic insecticidal composition comprising O,O-diethyl O-(7-(3-chloro-4-methylcoumaryl)) thiophosphate and ethyl N-benzylcarbamate, wherein said components are present in the ratio of about five parts of said carbamate per part of said thiophosphate.

References Cited in the file of this patent

UNITED STATES PATENTS

| | | |
|---|---|---|
| 2,503,390 | Jelinek | Apr. 11, 1950 |
| 2,679,508 | Gysin | May 25, 1954 |

OTHER REFERENCES

King: U.S.D.A. Handbook No. 69, May 1954, pp. 105–108.

Chemical Age, vol. 63, No. 1631 (1950), p. 540.

Sharp: Agr. News Letter, January-February 1952, pp. 1–3.

Roark: U.S. Dept. Agr. Bulletin E–344 (May 1935), pp. 2–6.

Frear: Chemistry of the Pesticides, 3rd ed., January 1955, pp. 73–91.